Aug. 4, 1953 J. O. JARMAN 2,647,732
FLUID MIXING CHAMBER
Filed March 13, 1952 2 Sheets-Sheet 2

James O. Jarman
INVENTOR.

BY
Attorneys

Patented Aug. 4, 1953

2,647,732

UNITED STATES PATENT OFFICE 2,647,732

FLUID MIXING CHAMBER

James O. Jarman, Colorado City, Tex.

Application March 13, 1952, Serial No. 276,348

2 Claims. (Cl. 259—4)

This invention relates to a fluid mixing device and particularly to a device for mixing chemicals with oil by setting up a vortex action in a mixing chamber.

In the oil industry a great quantity of the oil as originally produced is emulsified with various chemicals and solids so that it is unsaleable as produced. It is necessary to treat this emulsified oil or contaminated oil with certain chemicals which produce settlement of the impurities in the oil. It has heretofore been customary to introduce the chemicals into a large tank of the contaminated oil and to stir the oil mechanically to mix the chemicals therethrough after which the chemicals are removed into a sludge tank where the impurities are settled out and the treated oil is pumped over to a storage tank to be sold.

The present invention relates to a mixing device to be introduced into an oil line to mix chemicals with the oil as they are introduced into the sludge tank so that the oil will be treated as produced and the sludge settled in the sludge tank while the treated oil will be moved on over into the storage tank to be sold.

The apparatus according to the present invention comprises an intake or manifold chamber into which the oil is introduced and the mixing chamber of substantially cylindrical construction in which the oil is introduced in such a manner as to produce a vortex action and an outlet chamber in which the mixed oil is quieted down and introduced into an outlet pipe to go to the sludge tank.

It is an object of this invention to provide an improved mixing chamber.

It is a further object of this invention to provide a mixing chamber establishing its own vortex mixing action therein.

It is a further object of this invention to provide a mixing chamber for treating oil.

It is a further object of this invention to provide a mixing chamber having inlet passages so directed as to produce a vortex action therein.

It is another object of this invention to provide a mixing chamber in which oil and chemicals are thoroughly mixed and transmitted to a storage tank.

Other objects and many of the attendant advantages of this invention will be apparent from the following detailed description taken in conjunction with the accompanying drawings, in which:

Figure 4 is an exploded perspective showing the details of the construction of the device.

Figure 1:
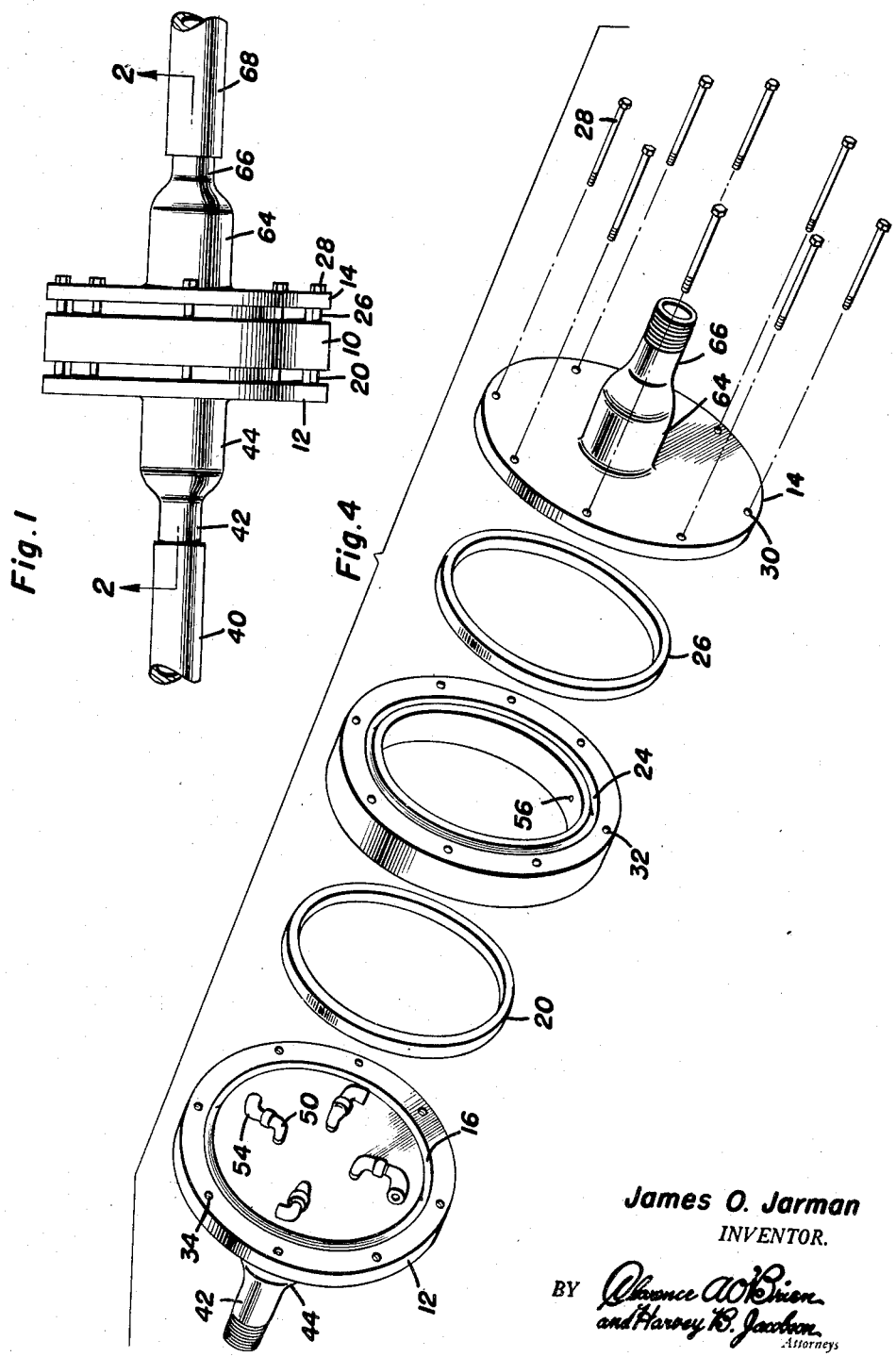
Figure 1 is an elevation of the mixing chamber according to the invention.
Figure 2:
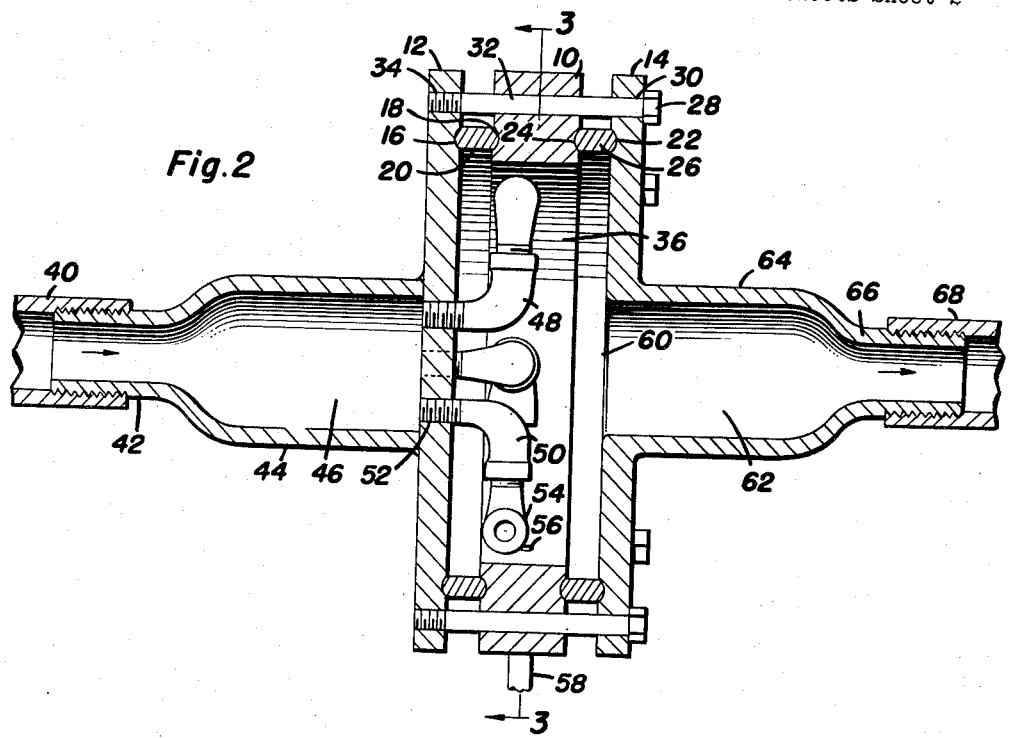
Figure 2 is an enlarged longitudinal sectional elevation of the mixing chamber taken substantially on the line 2—2 of Figure 1 and showing the construction of the mixing device.
Figure 3:
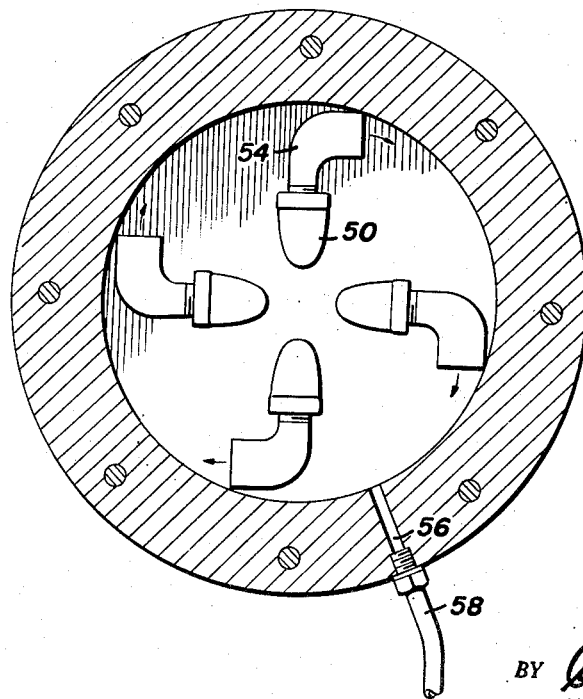
Figure 3 is a cross section of the device showing the arrangement of the inlet passages for producing the vortex action.

The fluid mixing device according to the invention comprises a cylindrical member 10 spaced from an end plate 12 and a second end plate 14. The plate 12 is provided with an annular groove 16 which is complementary to an annular groove 18 in the member 10. A sealing ring 20 is seated in the grooves 16 and 18 to provide a seal between the member 10 and the flange or plate 12. Likewise the plate or flange 13 is provided with an annular groove 22 while the member 10 is provided with a corresponding and cooperating groove 24 while an annular compression ring 26 is received in the grooves 22 and 24. The plates 12 and 14 are connected together by tensioning means such as the bolts 28 which extend through holes 30 in the plate 14, holes 32 in the member 10 and engage a threaded opening 34 in the plate 12. By turning the tension members 28 the plates can be securely connected so that the rings 20 and 26 are in compression between the plates and the member 10 to firmly complete fluid-tight seal therebetween. The plates 12 and 14 together with the annular member 10 produce a cylindrical chamber 36 which as constructed is of relatively greater diameter than length.

A fluid to be mixed such as oil is introduced through the inlet pipe 40 which is connected to a reduced section 42 of a tubular intake chamber 44. The intake chamber 44 being of substantially greater diameter than the inlet pipe 40 to produce a quieting manifold-type chamber.

The fluid in the chamber 44 is introduced into the chamber 36 by means of a plurality of fluid passages connecting to the chamber 44 and extending into the chamber 36. The passages 48 are substantially tubular in nature and as shown herein are produced by providing a plurality of L-shaped members and connecting them into series relation. For example, a street L 50 is connected through an opening 52 in the chamber 44 through the plate 12 and a second street L 54 is screwed into the first street L 50. This arrangement provides a passage 48 which terminates adjacent to the inner wall of the member 10 and is directed tangentially thereto so that the flow of fluid through the passage 48 will be discharged from the outlet end of the street L 54 substantially tangential to the inner surface of the member 10 and will consequently flow in substantially tangential relation around the inner periphery of the member 10 thus producing a vortex action in the chamber 36.

The member 10 is provided with a radially directed passage 56 to which a tube 58 is connected for introducing chemicals into the chamber 36.

The plate 14 is provided with an axial opening 60 which communicates with an outlet settling chamber 62 in a tubular member 64. The tubular member 64 is reduced at 66 for connection to an outlet pipe 68.

In the operation of the device the oil or other fluid to be mixed is introduced through the inlet pipe 40 into the chamber 46 where then flows through the various passages 48 which may vary in number from 1 to 12 or more depending on the amount of fluid and the type of fluid being passed therethrough. Because of the formation of the tubular channels 48 the fluid will be introduced into the chamber 36 at an angle substantially tangential to and adjacent to the inner surface of the member 10 so that the fluid flows in a vortex motion around the chamber 36 where it is mixed with a second fluid introduced through the opening 56 from the pipe 48. The vortex action in the chamber 36 thoroughly mixes the incoming fluids from the pipe 40 and the pipe 58 so that the mixed fluid is discharged through the axial opening 60 into the outlet chamber 62 where it is quieted down and transferred to the connection 66 to the outlet pipe 68 where it may go to any suitable storage or further treatment or for sale.

It will be apparent that the present invention provides a mixing chamber in which fluids are mixed in transit without the necessity of any further mechanical addition of energy or control.

A specific embodiment of the invention has been shown, and described according to the best present understanding thereof, however, it will be apparent to those skilled in the art, that changes in modifications can be made therein without departing from the true spirit of the invention.

Having described the invention, what is claimed as new is:

1. A fluid mixing device comprising a tubular intake chamber, a reduced connection to said chamber, a circular plate secured to said inlet chamber, an annular member, complementary grooves in said plate and said member, a sealing ring seated in said groove, a second plate complementary groove in said member and said second plate, a sealing ring seated in said groove between said member and said second plate, tensioning means drawing said plates into sealing relation with said member, an inlet passage in said member, a plurality of tubular passages extending from said intake chamber and terminating adjacent to and tangential with the inner surface of said member, said second plate having an axial passage therein, a tubular outlet chamber connected to said plate in communication with said passage, a reduced connection to said outlet chamber.

2. A continuous oil treating device comprising a cylindrical vortex chamber, an axial manifold chamber of less diameter than said vortex chamber, a partition separating said manifold chamber from said vortex chamber, a plurality of passages in said partitions, said passages terminating adjacent the wall of the vortex chamber and being directed tangentially thereto, a radial inlet passage in said vortex chamber, an axial outlet chamber in open communication with said vortex chamber.

JAMES O. JARMAN.

References Cited in the file of this patent

UNITED STATES PATENTS

| Number | Name | Date |
|---|---|---|
| 1,196,595 | Sharpe | Aug. 29, 1916 |
| 1,992,261 | Traudt | Feb. 26, 1935 |
| 2,528,514 | Harvey et al. | Nov. 7, 1950 |
| 2,532,973 | Wallentin et al. | Dec. 5, 1950 |
| 2,584,827 | Bailey | Feb. 15, 1952 |